United States Patent Office 2,804,736
Patented Sept. 3, 1957

2,804,736
PROCESS FOR PRESERVING REGENERATED CELLULOSE PELLICLE

Ellis Irving Lichtblau, Buffalo, N. Y., assignor to E. I. du Pont de Nemours and Company, Wilmington, Del., a corporation of Delaware No Drawing. Application September 14, 1953, Serial No. 380,137

3 Claims. (Cl. 53—21)

This invention relates to regenerated cellulose pellicular structures and, more particularly, to inhibiting the deleterious action of bacteria mold and the like on caps and bands of gel regenerated cellulose and of dry regenerated cellulose, and to maintaining such structures in normal condition.

Regenerated cellulose caps and bands are customarily packed and shipped in sufficient aqueous solution to maintain them in the gel state until they are used, i. e., applied to bottle necks, container tops, etc. Because the gel film and softener (usually glycerol) is particularly susceptible to attack and deterioration by bacteria and mold, the practice heretofore has been to incorporate in the aqueous shipping solution a water-soluble preservative material effective as a bactericide and mole inhibitor. A rust inhibitor, such as disodium phosphate, is also customarily included in the shipping solution. However, while water-soluble preservative materials afford satisfactory protection to the gel structures, they have, by reason of their water-solubility, a tendency to leach out in the aqueous shipping solution and thus afford little or no protection for such structures after they are applied and in the dry state.

An object of this invention, therefore, is to provide for the protection of both wet and dry caps and bands, and like pellicular structures, of regenerated cellulose against the deteriorating influence of bacteria and mold. Another object is to incorporate in gel regenerated cellulose pellicle structures an anti-bacteria, anti-mold agent which has substantially no tendency to leach into the shipping solution and which effectively protects the structure in the dry state. The foregoing and other objects will more clearly appear hereinafter.

The objects are realized by the present invention which, briefly stated, comprises impregnating the gel regenerated cellulose pellicular structure with an aqueous bath containing an alkali metal salt of dichlorophene (2,2'-dihydroxy, 5,5'-dichloro diphenyl methane); passing said impregnated structure through a dilute acid bath whereby to insolubilize, and precipitate in said structure, dichlorophene; washing the impregnated structure with water to remove any excess acid; and thereafter placing the impregnated structure in an aqueous solution containing ortho tolyl biguanide.

It has been found that even if dichlorophene be precipitated in water-insoluble form in the gel regenerated cellulose structure, it will nevertheless leach out when the structure is placed in a shipping solution of high pH value such as results from the presence therein of disodium phosphate customarily employed as a rust inhibitor. The present invention resides in large part in the discovery that if ortho tolyl biguanide is also present in the shipping solution, the dichlorophene does not leach from the gel structure even under conditions of high pH. Moreover, the resistance of the structure, in both the gel and dry stage, to the attack of bacteria and mold is much improved over the resistance realized with either agent alone.

In the conventional manufacture of bands, impregnation of the gel regenerated cellulose with an alkali metal dichlorophene and the acid-precipitation thereof in the gel structure is most conveniently carried out while the gel regenerated cellulose is in the form of continuous tubing, and just before the tubing is cut into band lengths. The impregnating bath should contain alkali metal salts of dichlorophene in sufficient concentration to give in the dried structures at least 0.05% by weight, based on the total weight of the dried structure, since amounts of dichlorophene below this limit do not provide adequate protection against the attack of bacteria and mold. In general, in order to secure an optimum concentration of dichlorophene (not less than 0.05%), in the dried band, the concentration of alkali-metal and preferably sodium salt of dichlorophene in the impregnating bath should be within the range of from 0.2% to 1%, by weight, depending upon the time the structure remains in the bath; and the shipping solution should contain at least 0.1% of ortho tolyl biguanide.

Precipitation of the dichlorophene in the gel regenerated cellulose structure is effectively carried out in a dilute acid solution, an acetic acid solution containing about 1% acetic acid being preferred.

The shipping solution into which the impregnated gel caps or bands are placed for storage and shipment may contain, of course, in addition to ortho tolyl biguanide, the usual softener, e. g., glycerol, and/or urea, and rust inhibitor, e. g., disodium phosphate, in the usual amounts.

The following specific examples further illustrate the principles and practice of the present invention. Percentages are by weight unless otherwise indicated.

EXAMPLE 1

To illustrate the susceptibility to attack and the rapidity with which untreated regenerated cellulose bands are attacked by bacteria and mold, gel regenerated cellulose bands were placed in an aqueous solution containing 7% glycerol as softener, but no preservative agents. The bands were thereafter removed from the softener bath and dried in an oven and stored at 90° F. and 95% RH (relative humidity). The dried bands maintained under those conditions exhibited mold within about 200 hours.

The following two examples illustrate the effectiveness of ortho tolyl biguanide when employed as the sole preservative:

EXAMPLE 2

Gel regenerated cellulose bands were placed in an aqueous solution containing 0.25% by weight, based on the total weight of the solution, of ortho tolyl biguanide, 7% glycerol softener, and 0.57% disodium phosphate, and allowed to come to equilibrium. They were then removed from the solution and dried in an oven and stored at 90° F. and 95% RH. As shown in Table I, mold appeared on the bands after only 400 hours' storage.

The disodium phosphate serves as an anti-rust compound as claimed in USP 2,079,147 (Banigan). It has no effect upon bacteria or mold.

EXAMPLE 3

Gel regenerated cellulose bands were impregnated in an aqueous solution containing 0.35% ortho tolyl biguanide, 7.0% glycerol and 0.57% disodium phosphate, and dried as in Example 2. The bands showed mold growth after 600 hours of storage at 90° F. and 95% RH. See Table I.

The effectiveness of dichlorophene when employed as the sole preservative is illustrated in the following examples:

EXAMPLE 4

Regenerated cellulose tubing was treated in an impregnating bath of dichlorophene so as to give 0.10% by weight, based on the weight of the dried tubing (bands), of dichlorophene in the dried tubing (bands). It was then treated in a dilute acetic acid solution (approximately 1% acetic acid) to precipitate the insoluble form of dichlorophene directly in the tubing. Next, the tubing was washed in water to remove any excess acid, and cut into bands. These bands were placed in an aqueous solution containing 7.0% glycerol and allowed to come to equilibrium. The bands were then dried in an oven and stored at 90° F. and 95% RH. Mold was present after only 200 hours' drying. See Table I. No disodium phosphate was used in Examples 4–8, inclusive, because, as pointed out above, in the absence of ortho tolyl biguanide, the acid-precipitated dichlorophene leaches out of the bands in an alkaline solution.

EXAMPLE 5

Regenerated cellulose tubing was treated in the same manner as in Example 4 so as to give 0.15% dichlorophene in the dried bands. Mold was doubtful at the end of 200 hours' storage and positive at the end of 400 hours. See Table I.

EXAMPLE 6

Dried bands containing 0.18% dichlorophene, treated as in Example 4, showed doubtful mold at the end of 800 hours. See Table I.

EXAMPLE 7

Dried bands, treated as in Example 4, containing 0.25% dichlorophene, showed doubtful mold at the end of 700 hours and positive mold on one sample at the end of 800 hours. See Table I.

EXAMPLE 8

Dried bands containing 0.31% dichlorophene, treated as in Example 4, showed no signs of mold after 800 hours of drying. See Table I.

The remarkable improvement in protection afforded by the combination of this invention is illustrated in the following examples:

EXAMPLE 9

Regenerated cellulose tubing was treated in an impregnating bath of dichlorophene so as to give 0.05% dichlorophene in the dried tubing (bands). The dichlorophene was then precipitated in the tubing with acetic acid (approximately a 1% acetic acid solution), the tubing washed, and cut into bands. The bands were allowed to come to equilibrium in a solution containing 0.35% ortho tolyl biguanide, 7.0% glycerol, and 0.57% disodium phosphate, and then dried. No mold had developed even after 800 hours. See Table I.

It is thus seen that even though as little as 0.05% dichlorophene is employed, the combination of dichlorophene and ortho tolyl biguanide gives much better protection than either of the compounds alone. In addition, for reasons not understood, the ortho tolyl biguanide exerts some sort of action to prevent the dichlorophene from being leached out of the bands in the alkaline solution.

EXAMPLES 10–13

Bands were prepared and tested in the same manner as in Example 9. All bands tested showed excellent resistance against bacteria and mold. See Table I.

*Table I*

| Example | Percent Dichlorophene [a] | Percent Ortho Tolyl Biguanide [b] | Percent Softener [b] | Percent Disodium Phosphate [b] | Dried Band Mold Resistance—Hours Stored [c] | | | | | | |
|---|---|---|---|---|---|---|---|---|---|---|---|
| | | | | | 200 | 300 | 400 | 500 | 600 | 700 | 800 |
| 1 | 0.00 | 0.00 | 7.0 | 0.00 | +++ | +++ | +++ | +++ | +++ | +++ | +++ |
| 2 | 0.00 | 0.25 | 7.0 | 0.57 | --- | --- | -?+ | ?++ | ?++ | +++ | +++ |
| 3 | 0.00 | 0.35 | 7.0 | 0.57 | --- | --- | --- | --- | --- | +++ | +++ |
| 4 | 0.10 | 0.00 | 7.0 | 0.00 | ?++ | +++ | +++ | +++ | +++ | +++ | +++ |
| 5 | 0.15 | 0.00 | 7.0 | 0.00 | --? | --? | --+ | --+ | --+ | --+ | --+ |
| 6 | 0.18 | 0.00 | 7.0 | 0.00 | --- | --- | --- | --- | --- | --- | --? |
| 7 | 0.25 | 0.00 | 7.0 | 0.00 | --- | --- | --- | --- | --- | --? | --+ |
| 8 | 0.31 | 0.00 | 7.0 | 0.00 | --- | --- | --- | --- | --- | --- | --- |
| 9 | 0.05 | 0.35 | 7.0 | 0.57 | --- | --- | --- | --- | --- | --- | --- |
| 10 | 0.11 | 0.35 | 7.0 | 0.57 | --- | --- | --- | --- | --- | --- | --- |
| 11 | 0.15 | 0.35 | 7.0 | 0.57 | --- | --- | --- | --- | --- | --- | --- |
| 12 | 0.29 | 0.35 | 7.0 | 0.57 | --- | --- | --- | --- | --- | --- | --- |
| 13 | 0.53 | 0.35 | 7.0 | 0.57 | --- | --- | --- | --- | --- | --- | --- |

[a] Percent dichlorophene in the dried band.
[b] Percent ortho tolyl biguanide in the shipping solution. Percent softener in the shipping solution. Percent disodium phosphate in the shipping solution. None was used in Examples 4–8, inclusive, because the acid-precipitated dichlorophene leaches out in an alkaline solution.
[c] Dried band mold resistance tests conducted at 90° F. and 95% RH in triplicate. (+) = positive mold growth; (−) = none; (?) = doubtful.

Hexachlorophene (2,2'-dihydroxy, 3,3', 5,5', 6,6'-hexachloro diphenyl methane) may also be used to advantage as a preservative for dried bands of regenerated cellulose, and may be incorporated in the gel structure as described above in connection with dichlorophene.

I claim:

1. A process of preserving pellicular structures of regenerated cellulose which comprises impregnating a pellicular structure of gel regenerated cellulose with an aqueous solution of an alkali metal salt of dichlorophene, passing the impregnated structure through a dilute acid solution, whereby to precipitate dichlorophene in said structure, and thereafter placing said structure in an aqueous solution comprising ortho tolyl biguanide.

2. A process of preserving pellicular structures of regenerated cellulose which comprises impregnating a pellicular structure of gel regenerated cellulose in an aqueous solution containing sufficient sodium salt of dichlorophene so as to give in the structure at least 0.05% by weight of dichlorophene, based on the weight of the dry impregnated structure, passing the impregnated structure through a dilute solution of acetic acid whereby to precipitate dichlorophene in said structure, and thereafter placing said structure in an aqueous solution containing at least 0.1% of ortho tolyl biguanide.

3. In the manufacture of regenerated cellulose bands wherein a continuous tubing of gel regenerated cellulose is formed, and is then cut into band lengths to form bands and the bands are packed in a preservative aqueous solution, the improvement which comprises impregnating said continuous tubing in an aqueous solution containing sufficient sodium salt of dichlorophene so as to give in the tubing at least 0.05% by weight of dichlorophene, based on the weight of dry impregnated tubing, passing said impregnated tubing through a dilute acid solution whereby to precipitate dichlorophene in said tubing, washing said tubing in water, cutting said washed tubing into band lengths, and packing said band in a preservative aqueous solution containing at least 0.1% of ortho tolyl biguanide.

References Cited in the file of this patent

UNITED STATES PATENTS 2,480,084    Meyer _____ Aug. 23, 1949

FOREIGN PATENTS 555,761    Great Britain _____ Sept. 7, 1943

OTHER REFERENCES

"Mold and Mildew Control," publication dated November 1946. (Chart between pages 22 and 23, and page 23 relied on.)

Industrial and Engineering Chemistry, vol. 41, No. 10, dated 1949. (Pages 2176–2178 and 2183 relied on.)